May 1, 1923. Re. 15,590
J. G. DE REMER
COMPRESSOR
Original Filed Jan. 16, 1918 2 Sheets-Sheet 1
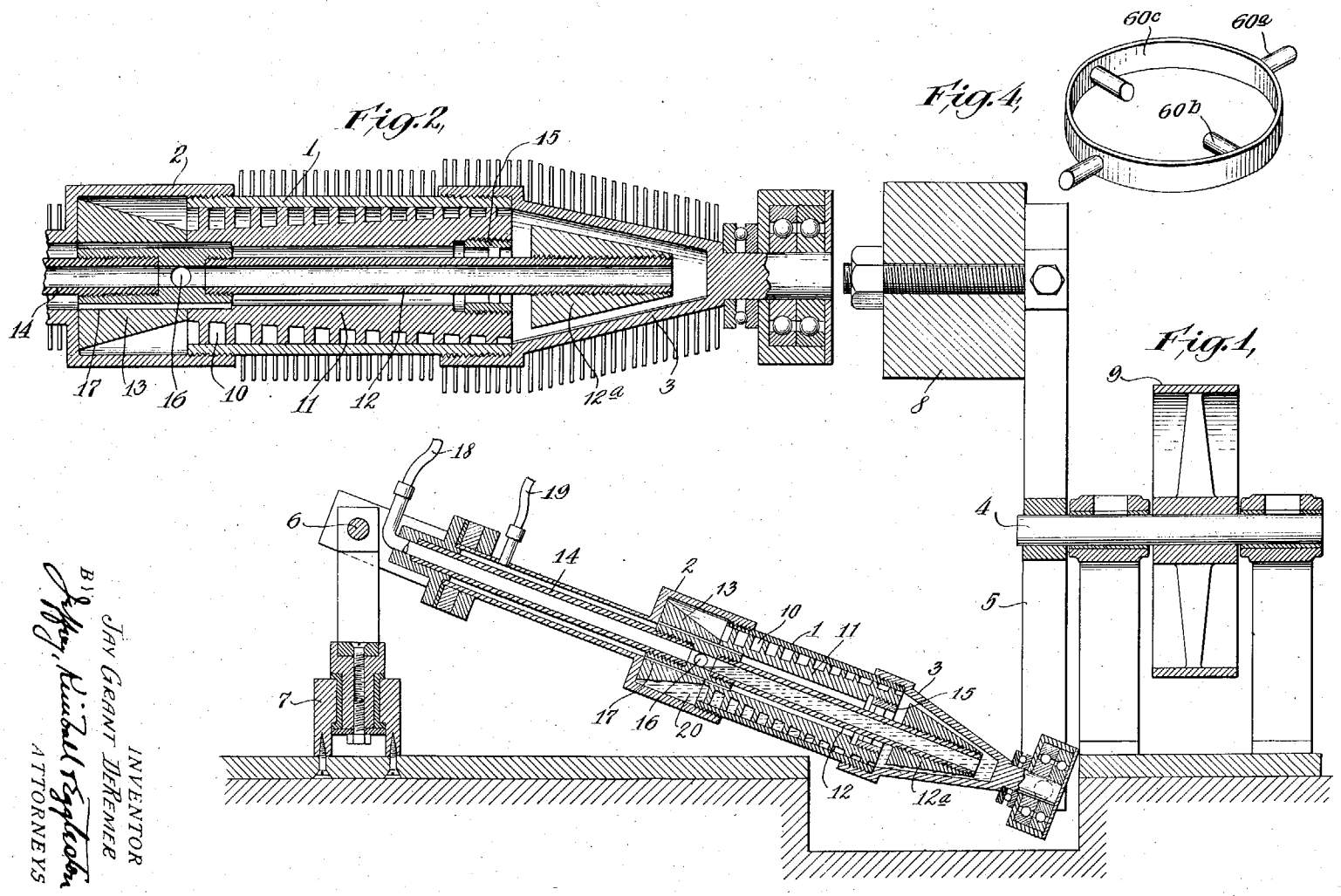
INVENTOR
JAY GRANT DEREMER
BY Jeffrey, Kimball & Eggleston
ATTORNEYS May 1, 1923. Re. 15,590

J. G. DE REMER

COMPRESSOR

Original Filed Jan. 16, 1918 2 Sheets-Sheet 2

INVENTOR
JAY GRANT DE REMER
BY Jeffery, Kimball & Eggleston
ATTORNEYS

Reissued May 1, 1923. Re. 15,590

UNITED STATES PATENT OFFICE.

JAY GRANT DE REMER, OF GREENWICH, CONNECTICUT.

COMPRESSOR.

Original application filed January 16, 1918, Serial No. 212,113. Divided and application filed December 9, 1919, Serial No. 343,471. Original No. 1,373,175, dated March 29, 1921. Application for resisue filed March 23, 1923. Serial No. 627,216.

*To all whom it may concern.*

Be it known that I, JAY GRANT DE REMER, a citizen of the United States, a resident of Greenwich, county of Fairfield, and State of Connecticut, formerly a resident of the city and county of San Francisco, State of California, have invented certain new and useful Compressors, of which the following is a specification.

This application is a division of my application Serial No. 212,113, filed in the Patent Office on January 16, 1918, patent No. 1,373,174, Mar. 29, 1921.

The present invention relates to improvements in fluid compressors or vacuum pumps of the type or class in which separate bodies of the fluid to be compressed or exhausted are successively forced through a helically formed conduit by the action of similarly separated masses of a suitable compressor liquid.

One of the objects of the invention is to provide an apparatus adapted for the purposes stated which does not require the use of valves, stuffing boxes, glands, piston rings or external moving parts, such as piston rods, valve stems, &c.

The apparatus is particularly advantageous for use with refrigerating apparatus and in the aforesaid parent application, I have shown several embodiments thereof for use with refrigerating apparatus, but it is to be understood that the invention is not so limited, but may be employed in various ways and arts for the production of pressure or vacuum.

The invention possesses other advantageous features, some of which with the foregoing, will be set forth at length in the following description, where I shall outline in full that form of the invention which I have selected for illustration in the drawings accompanying and forming part of the present specification. In said drawings I have shown two forms of the apparatus of my invention but it is to be understood that I do not limit myself to such forms, since the invention, as expressed in the claims, may be embodied in other forms.

Referring to said drawings:—

Figure 1 is a longitudinal sectional view of a compressor constructed in accordance with the present invention.

Fig. 2 is a longitudinal section, on a larger scale, of a portion of the compressor shown in Fig. 1.

Fig. 4 is a perspective view of the gimbal joint.

Figure 3:
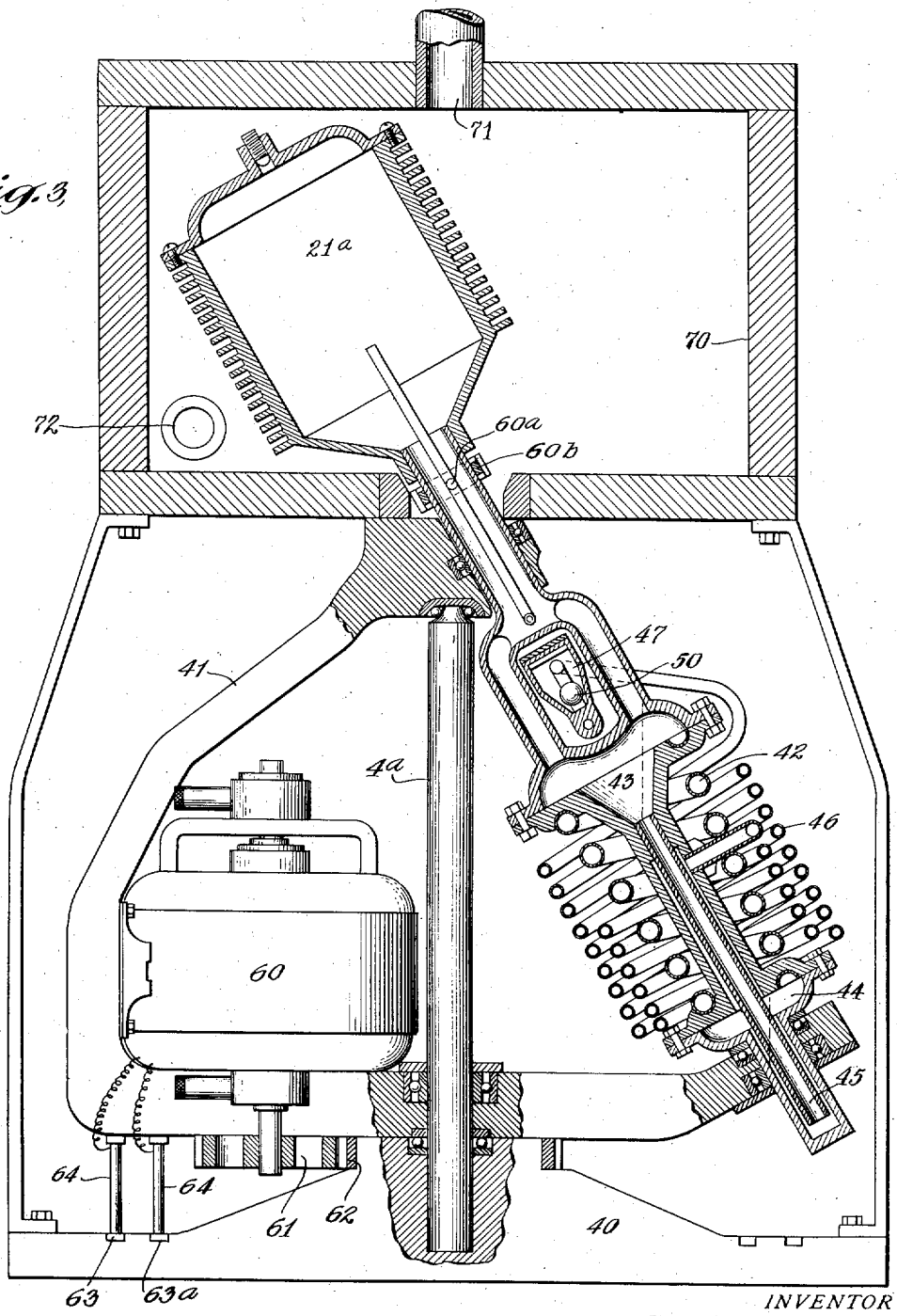
Fig. 3 is a vertical section of a modified form of the compressor.

Referring first to Fig. 1, which illustrates a compressor embodying the invention detached from any other apparatus and which may be considered as illustrating, more or less diagrammatically, the principle or method of operation employed, 1 designates a shell or casing to the ends of which suitable caps 2—3 are secured. Said casing is so supported that it is adapted to rotate bodily about the axis of a shaft 4 but does not rotate upon its own axis.

The compressor body, comprising the shell or casing 1 and end sections 2, 3, is held at considerable angle to the axis of shaft 4, the cap or end section 3 being shown as connected to an arm 5 while an extension of the end 2 is supported on a bearing situated coincident with a prolongation of the axis of said shaft. In the form illustrated the shaft 4 is arranged horizontally and the end of the inclined compressor nearest the axis of said shaft is supported by a universal joint comprising a horizontal shaft 6 mounted at the upper end of a yoke supported to turn about a vertical axis in a base piece 7.

The weight of the several parts is balanced about the axis of shaft 4 by a counterweight 8 and on said shaft is secured a power wheel or pulley 9.

Within the casing 1 is provided a helical passage 10 which is gradually reduced in area, or cross section, from its inlet end, adjacent the cap 2, to its delivery end. As shown this passage is formed by a peripheral groove or thread on a tubular body 11 which fits tightly within the shell or casing 1. In practice it is preferred to provide two of such helical passages arranged as a double thread.

A conduit 12 extends axially through the body 11 and projects into the end section 3 within which it is provided with an enlargement $12^a$ the exterior of which is of the same form but smaller than the chamber in the end or head 3. Said conduit is held in engagement with the body 11 by a coupling sleeve 13 that is screwed thereon and into the end of said body. Said sleeve is of such length that it extends to the end wall of the section 2 and is also fitted on the end of a conduit 14 by which the fluid to be compressed is supplied to the chamber within the cap or end section 2. A collar 15 is screwed into a socket at the lower end of body 11, about the conduit 12, said collar having a plurality of inwardly projecting radial studs or pins that contact with the conduit and assist in maintaining it in the desired relation to the body 11.

The supply conduit 14 through which the fluid to be compressed is supplied to the apparatus communicates with the chamber in the end section 2 adjacent the inlet end of the passage 10 through a plurality of radially extending ducts 16. A series of longitudinally extending ducts 17 in the body of the coupling sleeve 13 connect the passage surrounding the conduit 12 with the interior of the tubular extension of the end member 2 to provide a passage for the compressed fluid from the space surrounding the conduit 12 which communicates with the chamber in the head or end section 3.

18—19 designate, respectively, flexible pipes or tubes for supplying fluid to be compressed to the conduit 14 and for the escape of compressed fluid from the space surrounding said conduit.

A body 20 of suitable liquid, for example mercury, is introduced into the chamber in the end or head 2 and as the shaft 4 is revolved separate masses of such liquid will under the action of centrifugal force successively enter the passage 10 and act to compress the intermediate bodies of fluid received therein from the chamber about the coupling sleeve 13. The compressed fluid and mercury will be separated in the space surrounding the enlargement on the end of the conduit 12 the mercury being forced back through said tube, against the centrifugal force, by the pressure generated, until it reaches the ducts 16 through which it passes into the chamber surrounding the coupling sleeve 13 thus completing its circuit. The compressed fluid passes through the space surrounding the conduit 12 and the ducts 17 into the tubular extension of the end section 2 and to the pipe 19.

In operation, the mercury passes downward through the helical passage 10 into the casing 3 and thence backward up the tube 12 and through the passages 16 into the casing 2, where it again enters the helical passage. The apparatus is charged with sufficient mercury, so that, when operating, there is always mercury present in the casing 2 and, as long as mercury is present in this casing, it will enter the helical passage and be forced through said passage, by the movement of the helix about the axis of the shaft 4, into the casing 3. The amount of mercury present is sufficient to insure filling the tube 12, and to insure sufficient mercury in casing 2 to feed the helical groove and, in casing 3, to seal the lower opening of the tube 12 and to provide for the proper amount of mercury in the helical tube. When the device is started, mercury is present in the annular passage surrounding the tube 12 but, upon initial rotation, centrifugal force moves the mercury in the casing 3 to uncover the lower end of the annular passage and, as fluid under pressure is forced into the casing 3, this fluid enters the annular passage and forces the mercury therefrom into the casing 3.

With the shaft 4 rotating, the mercury must pass through the helical tube. The passage of this mercury builds up a pneumatic pressure or vapor pressure in the casing 3, which pressure is exerted on the mercury in the casing 3, operating to move the mercury up the tube 12. The vapor or gas under pressure fills the annular passage surrounding the tube 12, since this passage opens into the casing 3 above the mercury level. The presence of the vapor pressure or pneumatic pressure in the casing 3 insures the backward flow of the mercury through the tube 12 into the casing 2, the interior of which is at approximately atmospheric pressure. The circulation of the mercury is due to two causes; first, the presence of sufficient mercury to cause a back flow and, second, the pneumatic or vapor pressure produced in the casing 3.

It has been determined, experimentally, that the mercury will flow through the tube 10 upon rotation of the apparatus regardless of the pressure condition in the casing 3. The outlet conduit 19 has been closed, permitting a pneumatic pressure to build up in the casing 3, and this pressure is built up by the circulating mercury, until it forces the mercury downward in the casing 3 to a sufficient extent to break the seal or uncover the end of tube 12 permitting the gas under pressure to pass backward through the tube 12 and into the casing 2, whence it again passes through the helical tube.

In the apparatus illustrated in Fig. 3, which shows the compressor associated with an expansion chamber, constituting as a whole, a refrigerating machine, the several parts are so arranged that the axis about which the compressor is bodily movable is substantially vertical and the compressor is counterbalanced by the electric motor which is employed to rotate it.

Referring to said figures, $4^a$ designates a vertically arranged upright or post, which is supported in a suitable frame 40. The compressor, evaporation chamber and intermediate parts are mounted in a frame 41 supported by suitable bearings on the standard $4^a$ and frame 40 so as to revolve freely, being arranged so that the axis of the compressor coil is inclined to the axis about which the supporting frame 41 revolves. As shown the compressor comprises a helical coil 42 of tubing of uniform diameter, of conical form, or gradually tapering from its upper, receiving end to its lower discharge end, so that the same effect of decreasing volume per turn of the helix is produced, as is produced in the conduit of decreasing cross section shown in Fig. 1. Said coil connects the receiving and delivery chambers 43—44, which are further connected by a conduit 45 extending axially of the compressor coil for the purpose of returning the compressor liquid from adjacent the discharge end of the coil to the inlet end thereof. The compressed fluid is conducted from the chamber 44 through a passage surrounding the conduit 45 and a condenser coil 46 to a chamber 47, which is adapted to communicate with the evaporation chamber $21^a$ through a conduit.

The ends of the compressor are supported in ball bearings in the frame 41 while the connection between the compressor and evaporation chamber is prevented from rotating by a universal, gimbal joint comprising a ring $60^c$ having two sets of axial studs $60^a$—$60^b$, arranged at right angles to each other, so that as the machine is operated the compressor or coil will have the same motion as the helical passage in the form of compressor illustrated in Figs. 1 and 2. The studs $60^a$ are journaled in the wall of the inclosure 70 and the studs $60^b$ are journaled in the tube connecting the compressor and the expansion chamber.

Communication between the chambers 47—$21^a$ is controlled by a float valve 50 which is so shaped and proportioned that it is opened intermittingly to admit charges of the condensed compressed fluid to the evaporation chamber $21^a$.

This float valve is fully described in the parent application to which reference is made for a more complete disclosure thereof.

The frame 41 is rotated by an electric motor 60 mounted in the frame on the opposite side of the axis of the upright $4^a$ from the compressor. As shown, the armature of the motor is provided with a pinion 61 that meshes with a gear 62 secured to the base in which the upright $4^a$ is supported and current is supplied to the motor from two contact rings 63—$63^a$ secured to said base and over which travel brushes 64 connected with the terminals of the motor winding.

The evaporation chamber $21^a$ is shown within a suitable inclosure 70 supported on the frame 40 and provided with suitable inlet and outlet pipes 71—72. The walls of the inclosure 70 may be of suitable nonheat conducting material.

It will, of course, be understood that the various views are more or less diagrammatic and that the several parts may be differently proportioned from those shown.

As before stated, and as is evident, the apparatus may be readily employed as a vacuum pump. In such use the tube 18 will be connected with the space to be evacuated and the tube 19 with the atmosphere for example.

By supplying a suitable power fluid to the tube 19 and permitting exhaust through the tube 18 the apparatus is adapted for use as a prime mover.

I claim:

1. In an apparatus for the purpose described, the combination of a helically formed conduit supported to revolve about an axis forming an acute angle to the axis of its helix, the smaller end of said conduit being more remote from the axis of revolution than the larger end thereof, two chambers communicating respectively with the ends of said conduit, and means for revolving the conduit.

2. In an apparatus for the purpose described, the combination of a shaft-like support, a helically formed conduit of decreasing volume per turn carried by said support in an inclined position, the larger end of the helix being at a less distance from the axis of said support than the smaller end thereof, means for supplying liquid and fluid to be compressed to the larger end of the conduit, means for conducting compressed fluid from the smaller end of said conduit, and means for revolving the conduit about the axis of the support.

3. In a fluid compressor, the combination of a rotor comprising a helically formed conduit of decreasing volume per turn and two chambers communicating respectively with the ends of said conduit, a body of compressor liquid permanently contained within said rotor, means for supplying fluid to be compressed to the chamber at the larger end of the conduit helix, means for revolving the rotor about an axis extending at an angle to the axis of said helix, means for withdrawing compressed fluid from the chamber at the smaller end of the helix, and means for returning the compressor liquid from the last said chamber to the chamber at the other end of the helix.

4. In a fluid compressor, the combination of a rotor comprising a helically formed conduit of decreasing volume per turn and two chambers communicating respectively with the ends of said conduit, a body of compressor liquid permanently contained within said rotor, means for supplying fluid to be compressed to the chamber at the larger end of the conduit helix, means for revolving the rotor about an axis extending at an angle to the axis of said helix, means for withdrawing compressed fluid from the chamber at the smaller end of the helix, and a conduit extending along the axis of the helix for returning the compressor liquid from the last said chamber to the chamber at the inlet end of the helix.

5. In a fluid compressor, the combination of a rotor comprising a helically formed conduit of decreasing volume per turn and two chambers communicating respectively with the ends of said conduit, a body of compressor liquid permanently contained within said rotor, means for supplying fluid to be compressed to the chamber at the larger end of the conduit helix, means for revolving the rotor about an axis extending at an angle to the axis of said helix, means for withdrawing compressed fluid from the chamber at the smaller end of the helix, and two concentric conduits leading from the last said chamber, the inner of said conduits extending to the chamber at the inlet end of the helix.

6. In an apparatus of the character described, a helically formed conduit supported to be moved in a circle about an axis forming an acute angle with the axis of its helix and exterior to the helix, chambers communicating respectively with the ends of the conduit, a tubular return conduit between said chambers, and means for moving said conduits about said exterior axis.

7. In an apparatus of the character described, a helically formed conduit arranged exterior to and with its axis at an acute angle to an axis of rotation, means for supplying liquid and fluid to the end of the conduit nearest the axis of rotation, means for conducting compressed fluid from the other end of the conduit, a tubular return conduit to conduct said liquid away from said other end to the end nearest the axis of rotation, and means for revolving the conduit about said axis of rotation.

8. In an apparatus of the character described, a helically formed conduit having the axis of the helix arranged at an acute angle to an axis of rotation disposed exteriorly to the axis of the helix, means for alternately supplying liquid and fluid to the end of the conduit nearest the axis of rotation and a tubular return conduit for the liquid extending through the helix to said end.

9. In an apparatus of the character described, a helically formed conduit arranged to be moved in a circle about an axis inclined to the axis of the helix and spaced from the helix whereby different parts of the helix move through circles of different diameter, means for alternately supplying liquid and fluid to that end of the conduit which moves through the circle of lesser diameter and a tube extending parallel to the axis of the helix for returning liquid from the high pressure to the low pressure end thereof.

10. In an apparatus of the character described, a helically formed conduit of decreasing volume per turn supported to be moved in a circle about an axis forming an acute angle with the axis of the helix and exterior to the helix, chambers communicating respectively with the ends of the conduit and means for moving the conduit about said exterior axis.

11. In a compressor, a casing containing a passage through which compressing liquid may circulate to compress a gaseous fluid, a rotary support whereon said casing is carried with one end farther removed from the axis of said support than the other and inlet and outlet passages for said fluid connected to said casing at the end nearest said axis.

12. In a compressor, a casing containing a passage through which a compressing liquid may circulate to compress a fluid, a rotary support on which said casing is carried with one end thereof farther removed from the rotational axis than the other, and flexible inlet and outlet tubes connected to the casing, for leading such fluid to and from the casing.

13. In a compressor, a casing containing a passage through which a compressing liquid circulates to compress a fluid, a rotary support whereon said casing is carried at an inclination to the rotational axis and a counterweight on said support for said casing.

14. In a compressor, a body having a helical groove formed therein, a casing applied to said body and therewith forming a helical conduit of said groove, chambers connected respectively with the ends of said conduit, a compressing liquid in said conduit, a return conduit for returning compressing liquid from one chamber to the other chamber and means for rotating said conduits to cause a circulation of the liquid through the same.

15. In apparatus of the kind described, a helical conduit having high and low pressure chambers at its opposite ends and mounted to revolve about an axis inclined to its helical axis, a body of dense liquid contained in said conduit and chambers, means for supplying a lighter fluid to the low pressure chamber and conducting it from the high pressure chamber and means for returning the dense liquid to the low pressure chamber comprising a tubular conduit extending into, and below the surface of said dense liquid in the high pressure chamber.

In testimony whereof, I have hereunto set my hand at New York, N. Y., this 22nd day of March, 1923.

JAY GRANT DE REMER.